United States Patent [19]

Kikuchi et al.

[11] Patent Number: 4,940,343
[45] Date of Patent: Jul. 10, 1990

[54] WIRE-DOT PRINT HEAD DRIVING APPARATUS

[75] Inventors: Hiroshi Kikuchi; Jiro Tanuma; Hideaki Ishimizu; Chihiro Komori, all of Tokyo, Japan

[73] Assignee: OKI Electric Industry Co., Ltd., Tokyo, Japan

[21] Appl. No.: 395,159

[22] Filed: Aug. 17, 1989

Related U.S. Application Data

[63] Continuation-in-part of Ser. No. 235,971, Sep. 24, 1988, abandoned.

[30] Foreign Application Priority Data

Aug. 26, 1987 [JP] Japan ................................ 62-210138
Aug. 26, 1987 [JP] Japan ................................ 62-210139
Oct. 19, 1987 [JP] Japan ........................ 62-158792[U]

[51] Int. Cl.⁵ .............................................. B41J 3/12
[52] U.S. Cl. .................................. 400/124; 400/157.2; 361/153; 361/160
[58] Field of Search ................... 400/124, 157.2, 157.3, 400/166, 167; 361/152, 1, 170

[56] References Cited

U.S. PATENT DOCUMENTS

| 3,928,796 | 12/1975 | Kaiser | 318/662 |
| 4,263,546 | 4/1981 | Morris | 318/662 |
| 4,433,926 | 2/1984 | Isobe et al. | 400/124 |
| 4,523,867 | 6/1985 | Berrey et al. | 400/124 |
| 4,637,742 | 1/1987 | Sakai | 400/157.2 |
| 4,661,882 | 4/1987 | Presley | 361/159 |

FOREIGN PATENT DOCUMENTS

| 1914045 | 7/1976 | Fed. Rep. of Germany | 318/662 |
| 3427257 | 2/1985 | Fed. Rep. of Germany | 400/124 |
| 59-2864 | 1/1984 | Japan | 400/157.2 |
| 1303124 | 1/1973 | United Kingdom | 318/662 |

Primary Examiner—David A. Wiecking
Assistant Examiner—Steven S. Kelley

[57] ABSTRACT

A driving apparatus for a wire-dot print head in a wire-dot impact printer has a sensor mounted in the print head to detect the motion of the print wires, enabling each print wire to be driven for the optimum time for each dot. Beneficial results include improved print quality, reduced power consumption and operating temperature, and faster printing.

13 Claims, 13 Drawing Sheets

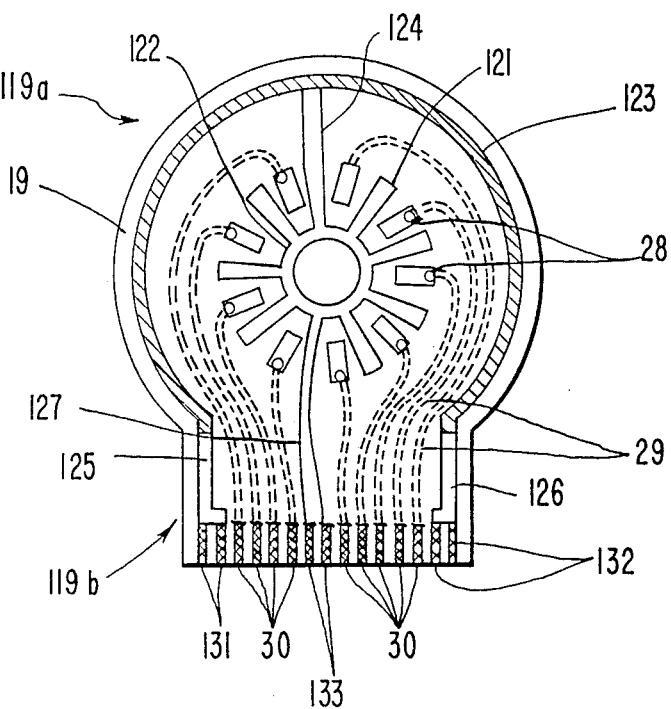

SIGNAL A

SIGNAL B

SIGNAL C

SIGNAL D

F I G. 14
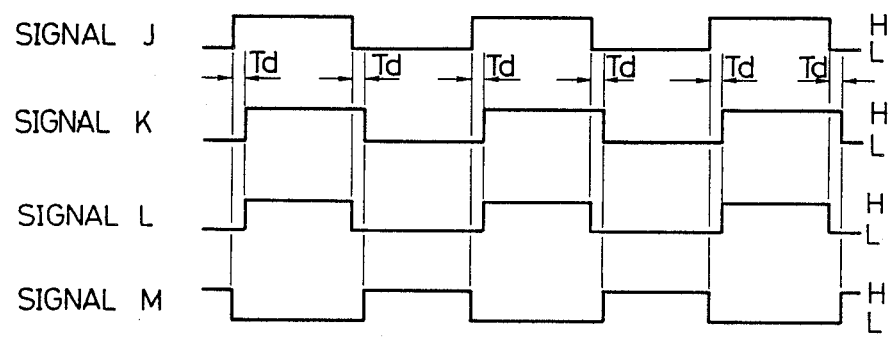

WIRE-DOT PRINT HEAD DRIVING APPARATUS

This application is a continuation-in-part of now abandoned application, Ser. No. 07/235,971 filed on Aug. 24, 1988.

BACKGROUND OF THE INVENTION

This invention relates to an apparatus for driving a wire-dot print head in a wire-dot impact printer.

A wire-dot print head comprises a plurality of print wires, and a means for driving the print wires forward so that their ends impact on a sheet of paper. An inked ribbon is interposed between the ends of the print wires and the paper so that the impact of each wire causes the printing of a dot. Characters and graphic designs are printed as a matrix of dots by driving the print wires at appropriate times as the head travels across the paper.

In the well-known spring-release type of wire-dot print head, the means for driving each print wire comprises an armature, a plate spring, and an electromagnet. The plate spring is secured at one end. The print wire is attached to the armature, which is mounted on the free end of the plate spring. Normally a permanent magnet holds the spring in a flexed position in which the print wire is retracted. When the electromagnet of a print wire is energized (driven), it produces a magnetic field opposing the field generated by the permanent magnet. These two fields cancel each other, releasing the spring, which drives the print wire forward to print a dot. When the energizing current is removed from the electromagnet, the permanent magnet again attracts the spring, causing the print wire to return to its retracted position in preparation for printing the next dot.

A critical parameter in this driving means is the length of time for which the electromagnet is driven in order to print a dot. If this time is too short, the impact will be weak or absent, causing printing irregularities such as faint or skipped dots. If the driving time is too long, however, the print wire will be late in returning to its retracted position, so it will not be ready to print the next do unless the printing rate is reduced to an undesirably slow speed.

The optimum driving time depends on a plurality of factors, one of which is the voltage Vcc applied to the electromagnet. A prior-art scheme for controlling the driving time employs a resistor and capacitor connected in series between Vcc and ground, with the driving time regulated according to the charging time of the capacitor. This scheme automatically compensates for variations in Vcc.

This prior-art timing scheme, however, fails to compensate for factors such as the varying gap between the paper and the ends of the retracted wires (called the head gap), or for wire-to-wire variations in, for example, the strength of the spring, or for variations caused by magnetic interference inside the print head. To allow for such variations, it is necessary to add a margin to the driving time so that on the average the elecromagnet is driven for longer than the optimum time. As a result, the prior-art wire-dot print head driving apparatus is unnecessarily slow, consumes unnecessary current, generates unnecessary heat, and produces printed output of inferior quality due to the non-optimal driving time.

SUMMARY OF THE INVENTION

An object of the present invention is to provide a driving apparatus for a wire-dot print head that solves the above-mentioned problems.

Another object of the invention is to optimize the timing of driving of the print wires.

According to the invention, the print wires are controlled individually as to the driving time. For this purpose, sensing means is provided to sense the position of each print wire and generating a signal indicating the position of the print wire. Driving means is provided for driving the print wires with a timing determined by these signals.

BRIEF DESCRIPTION OF THE DRAWINGS

FIG. 14 illustrates waveforms at several points in the circuit in FIG. 13.

DETAILED DESCRIPTION OF THE PREFERRED EMBODIMENTS

Embodiments of this invention will explained with reference to the drawings in FIGS. 1 to 14.

Figure 1:
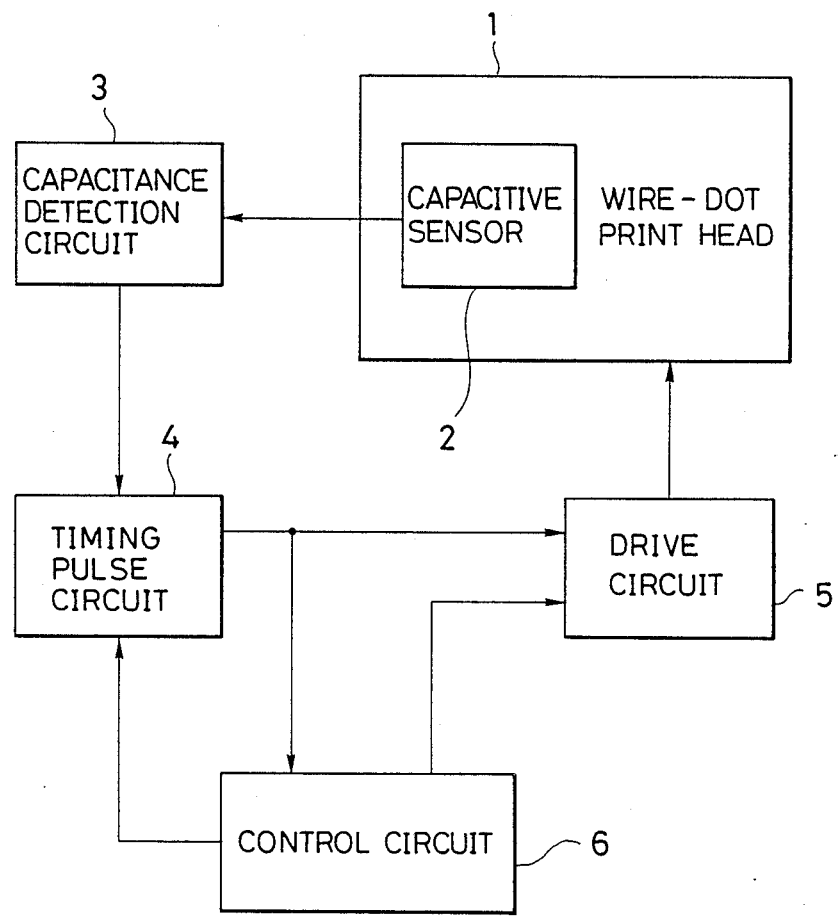
FIG. 1 is a block diagram illustrating a wire-dot print head driving apparatus according to an embodiment of the present invention.

FIG. 1 is a block diagram of an embodiment of a driving apparatus for a wire dot matrix print head according to this invention, comprising a wire-dot print head 1, a capacitive sensor 2, a capacitance detection circuit 3, a timing pulse circuit 4, a drive circuit 5, and a control circuit 6.

Figure 2:
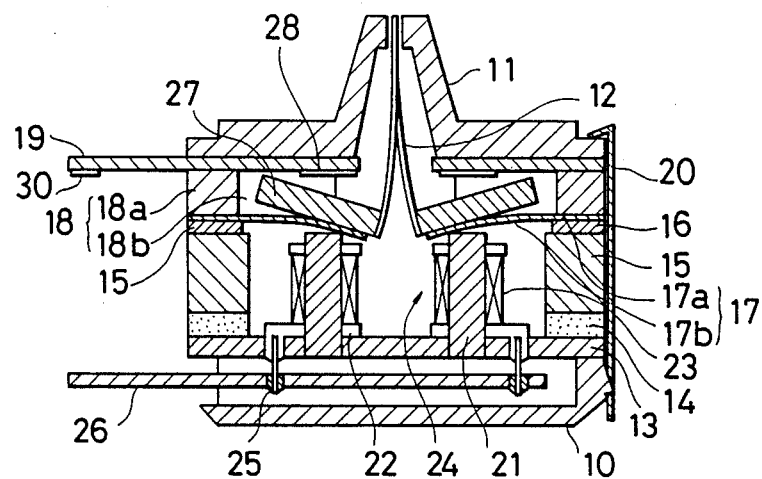
FIG. 2 is a sectional view of the print head in FIG. 1.

FIG. 2 shows a sectional view of an embodiment of the wire-dot print head 1, which is generally cylindrical. The print head 1 has a generally disk-shaped cover 10 at the bottom and a guide frame 11 at the top. The guide frame 11 of this embodiment is formed of an electrically insulating material such as a plastic resin and has central guide openings through which the print wires 12 protrude for impact on a print medium such as a print paper on a platen, not shown. The print wires 12 extend forward generally parallel with each other. For the purpose of explanation, "front" or "forward" refer to the direction toward which the print wires are moved for impact on the paper, i.e., upward as seen in FIG. 2.

Between the cover 10 and the guide frame 11 are mounted, in sequence from rear side (bottom in FIG. 2) to the front side (top in FIG. 2), a generally disk-shaped base plate or rear yoke 13 of a magnetically permeable material, an annular permanent magnet 14, an annular upright support 15, an annular spacer 16, a plate spring 17 having an annular part 17a and protrusions 17b extending radially inward, and a front yoke 18 having an annular part 18a and protrusions 18b extending radially inward. The permanent magnet 14, the upright support 15, the spacer 16, the annular part 17a of the plate spring 17 and the annular part 18a of the front yoke 18 have generally the same outer and inner peripheries and form a cylindrical wall for the print head 1. All these components are held together by an external clamp 20.

The annular part 17a of the plate spring 17 is clamped between the annular part 18a of the front yoke 18 and the spacer 15. Elongated armatures 27 extend in radial directions and attached to the respective protrusions 17b of the plate spring 17. Thus each protrusion 17b of the plate spring 17 acts as a resilient support member for the associated armature 27. Each armature 27 is positioned between adjacent protrusions 18b of the front yoke 18. Conversely stated, there is one protrusion 18b of the front yoke 18 between adjacent armatures 27. The side surfaces of the armatures 27 and the side surfaces of the protrusions 18b are in close proximity with each other. The armatures 27 are provided in associated with the respective print wires 17. A rear end of each print wire 12 is fixed to the inner end of the associated armature 27.

Cores 21 are provided in association with the respective armatures 27. Each core 21 has its forward end adjacent to rear surface of the associated armature 27. The cores 21 are mounted on the base plate at their rear ends. Bobbins 22 are provided to surround the respective cores 21 and are also mounted on the base plate 13. Coils 23 are provided in association with the respective cores 21. Each core 23 is wound on the bobbin 22 for the associated core 21, to form an electromagnet 24, which is electrically coupled via a coil terminal 25 to a printed circuit card 26 disposed beneath the base plate 13, between the phase plate 13 and the cover 10. The printed circuit card 26 is provided with a card-edge connector (not shown in the drawing) having an input terminal for each coil terminal 25 and with copper foil wiring, formed by patterning, for connecting respective coil terminals 25 and input terminals. The input terminals are electrically coupled to the drive circuit 5 in FIG. 1.

The rear yoke 13, the cores 21, the armatures 27, the front yoke, the annular part 71a of the plate spring 17, the spacer 15, and the upright support 15 forms a magnetic path for the magnetic flux from the permanent magnet 14. Because of this magnetic flux the armtures 27 are attracted to the cores 21.

As will be described in further detail later, an electric current is made to flow through the coils 23 for generating a magnetic flux through the core 21 in a direction to cancel to magnetic flux throug the core 21 from the permanent magnet 14. When each of the coils 23 is not energized the associated armature 27 is attracted toward the associated core 21 to resiliently deform the associated resilient support member 17b. When each of the coils 23 is energized the associated armature 27 is released and moved forward by the action of the associated resilient support member 17b.

A sensor card 19 in the form a printed circuit board is positioned in front of the front yoke 18. Sensor electrodes 28 are formed on the sensor card 19, and are created by patterning. The sensor electrodes 28 are in association with the respective armatures 27 and confront the front surfaces of the associated armatures 27 when the latter are moved forward, for printing. The armature 27 and the sensor electrode 28 form a pair of opposing plates with an air gap between them, thus acting as an air-gap capacitor with a static capacitance that depends on the width of the gap, hence on the position of the armature 27. It is this capacitor that is denoted as the capacitive sensor 2 in FIG. 1. The motion of the print wire 12 attached to the armature 27 can be detected by sensing the capacitance change of this capacitive sensor 2.

Figure 3:
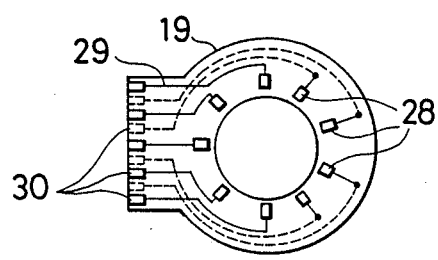
FIG. 3 is a plan view of the sensor card in the print head in FIG. 2.

FIG. 3 shows a plan view of the sensor card 19. In this example the head has nine print wires 12, hence nine armatures 27 and nine sensor electrodes 28 which are also called individual electrodes. An independent connecting line 29 leads from each sensor electrode 28 to a card-edge connector with output terminals 30. The output terminal 30 are connected to the capacitance detection circuit 3 in FIG. 1. In the illustrated example, some connecting lines run on the same side of the sensor card 19 as the sensor electrodes 28, while others run on the opposite side and connected to the sensor electrodes 28 via through holes. The sensor electrodes 28, and the connecting lines 29 as well as the rest of the sensor card 19 are coated with an insulating film, such as a photoresist applied over the entire surface of the sensor card. This coating insulates the electrodes and the connecting lines from the yoke and provides protection against damages in case of collision during assembly or during operation of the print head. The armatures 27 are electrically coupled via the plate springs 17 to a common ground terminal, which is connected to the capacitance detection circuit 3 as well as other circuits.

FIG. 3A shows a plan view of another example of the sensor card, denoted by 119. This sensor card 119 is similar to the sensor card 19 shown in FIG. 3 and consists of a substantially disk-shaped part 119a and a band-shaped part 119b having a first edge connected to the disk-shaped part 119a. The disk-shaped part 119a has substantially the same diameter as the annular part 18a of the front yoke 18, and is disposed to align the annular part 18a of the front yoke 18. The band-shaped part 119b therefore projects laterally from the annular part 18a of the front yoke 18.

The sensor card 119 differs from the sensor card 19 in that it is further provided with a pattern of common electrode conductors having radial strip-shaped parts 121 extending radially between adjacent sensor electrodes 28, an inner annular part 122 concentric with the disk-shaped part 119a and connecting the inner ends of the radial parts 121, an outer arcuate part 123 extending along the circumference of the disk-shaped part 119a of the sensor card 119, a connecting part 124 connecting the inner annular part 122 and the outer arcuate part 123.

The sensor card 119 is further provided with output terminals 131, 132, 133 provided at a second of the band-shaped part 119b of the sensor card 119. The terminals 131, 132 on both ends of the array of terminals 30 are connected via connecting strip-shaped conductor parts 125 and 126 to both ends of the outer arcuate part 123. The terminals 133 in the middle of the array of terminals 30 are connected via another connecting strip-shaped conductor part 127 to the inner annular part 122.

The terminals 131, 132, 133 and the terminals 30 are the terminals of a single card-edge connector, and connected to the capacitance detection circuit 3 in FIG. 1 as well as to other circuits.

The sensor electrodes 28, the connecting lines 29, the radial parts 121, the inner annular part 122, the connecting parts 124, 125, 126, 127 are coated with an insulating film, such as a photoresist applied over them for electrical insulation and protection against damages.

The outer arcuate part 123 is not covered with the insulating coating and is exposed so that it is in contact with the annular part 18a of the front yoke 18 (FIG. 2) when mounted in the print head 1 shown in FIG. 2. The front yoke 18 is connected to the plate springs 17, which in turn is connected to the armatures 27, constituting the movable electrodes of the capacitive sensors. Thus, the armatures 27 are electrically connected to the terminals 131, 132, 133 and hence to the capacitance detection circuit 3 as well as other circuits.

The outer arcuate part 123 should be sufficiently thick so that is surface is "more projecting" toward the confronting front yoke 18 than the surface of the insulating coating. This will ensure good electric contact between the outer arcuate part 123 and the front yoke 18.

The radial parts 121 disposed between sensor electrodes 28 serves as electro-magnetic shield to prevent interference between adjacent sensor electrodes 28.

Figure 4:
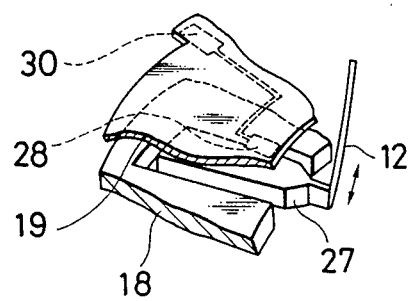
FIg. 4 is an oblique view illustrating the armature and sensor electrode in FIG. 2.

FIG. 4 is an oblique view showing how an armature 27 is mounted in relation to the front yoke 18, how it drives the print wire 12, its relation to the sensor electrode 28, and the connection of the sensor electrode 28 to the output terminal 30. For clarity, the sensor card 19 is shown slightly separated from the front yoke 18, but when the wire-dot print head 1 is assembled, the sensor card 19 and the front surface of the front yoke 18 are actually in contact. The protrusions 18b of the front yoke 18 are on both sides of each armature 27 so that they effectively shield the sensor electrode 28 to avoid interference between adjacent sensor electrodes 28.

Figure 5:
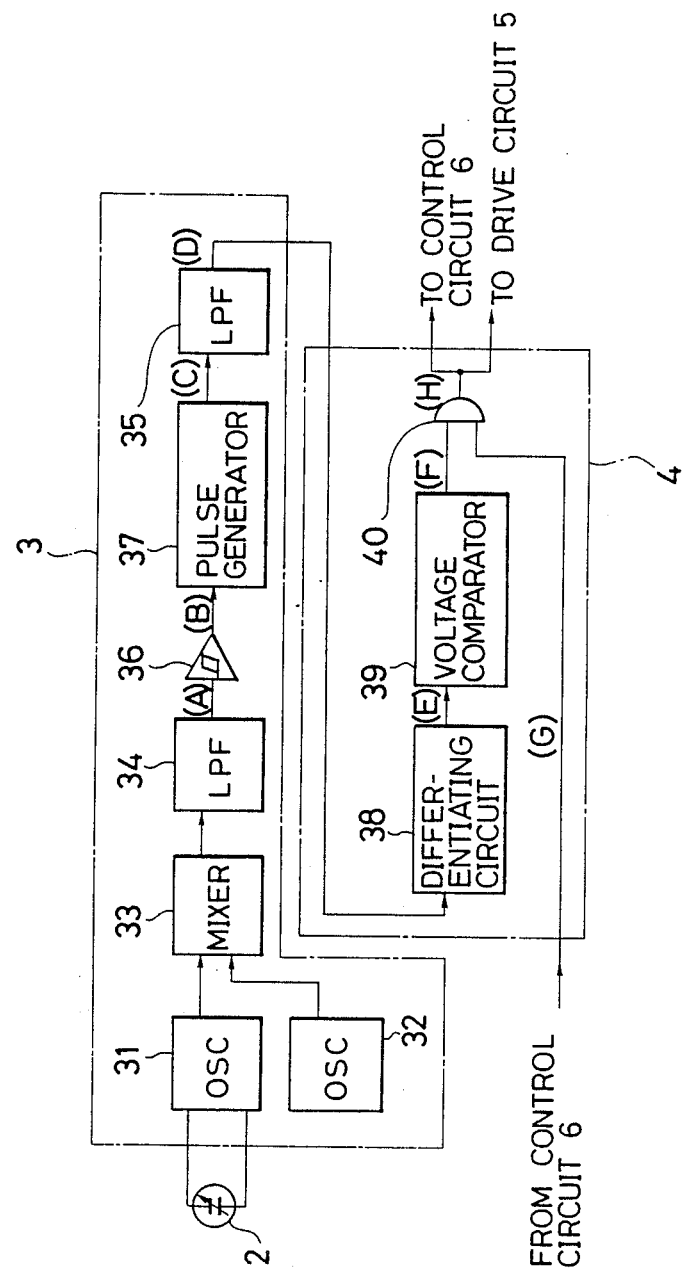
FIG. 5 is a block diagram of an embodiment of the sensor and timing circuits in FIG. 1.

FIG. 5 is a block diagram of an embodiment of the capacitance detection circuit 3 and the timing pulse circuit 4. The capacitance detection circuit 3 comprises, for each capacitive sensor 2, a pair of oscillators 31 and 32, a mixer 33, low-pass filters 34 and 35, a wave-shaping circuit 36, and a pulse generator 37. The timing pulse circuit 4 comprises, for each capacitive sensor 2, a differentiating circuit 38, a voltage comparator 39, and an AND gate 40. Although there is a separate capacitance detection circuit 3 and timing pulse circuit 4 for each capacitive sensor 2, all are identical in configuration, so only one is shown.

The capacitive sensor 2 is connected to the oscillator 31 and causes the oscillator frequency to change in response to the changing static capacitance of the capacitive sensor 2; that is, the static capacitance between the armature 27 and the sensor electrode 28 in FIG. 2. The output of the oscillator 31 and the output of the oscillator 32 are fed to the mixer 33. The frequencies of the oscillator 31 and the oscillator 32 are adjusted to approximately 100 MHz and approximately 110 MHz, respectively and the output of the mixer 33 includes frequency components equal to the sum and difference of these two frequencies. This output is supplied to the low-pass filter 34 which extracts the difference frequency component of approximately 10 MHz, and this component is amplified. The static capacitance value of the capacitive sensor 2 increases when the print wire 12 moves forward toward the paper, and is minimal when the print wire 12 returns to its retracted position. Thus when the print wire 12 is displaced toward the paper, the frequency of the oscillator 31 decreases and the frequency output by the low-pass filter 34 increases. The output of the low-pass filter 34 is further sent to the wave-shaping circuit 36 which reshapes it into a square wave, which is sent to the pulse generator 37. The pulse generator 37 consists of a one-shot multivibrator, the output of which is supplied to the low-pass filter 35.

Figure 6:
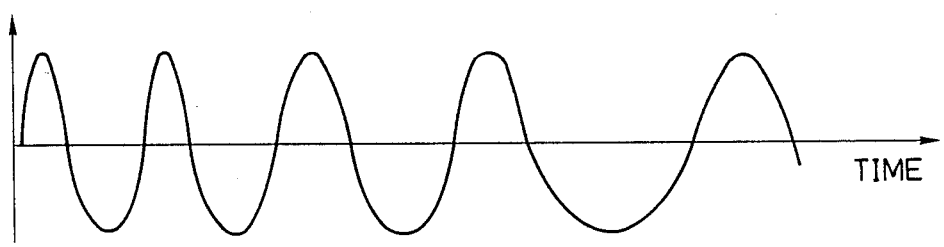
FIGS. 6 and 7 illustrate signal waveforms at various points in FIG. 5.
Figure 6:
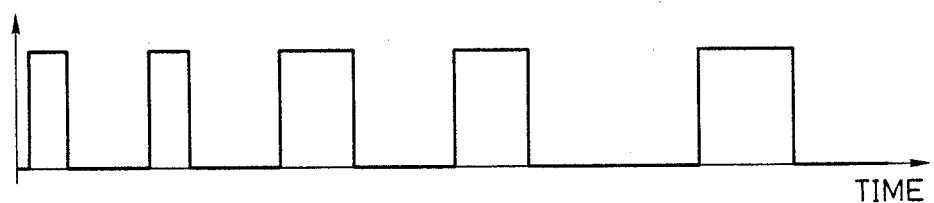
Figure 6:
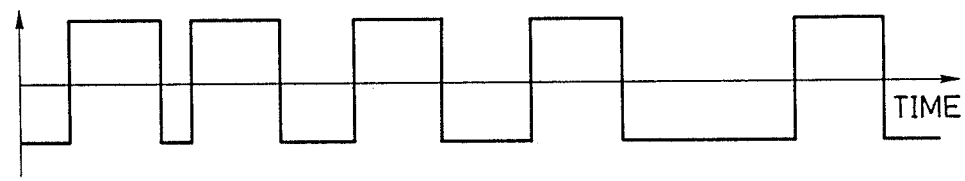
Figure 6:
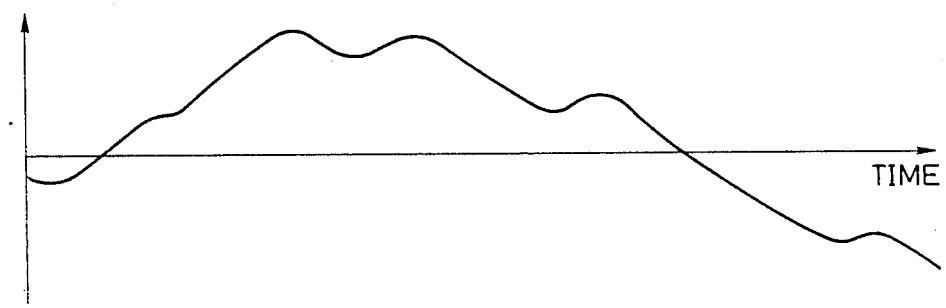

FIG. 6 shows the output signal A of the low-pass filter 34, the output signal B of the wave-shaping circuit 36, the output signal C of the pulse generator 37, and the output signal D of the low-pass filter 35. It can be seen that a change in frequency is converted to a pulse train C with equivalent pulse widths, which is integrated to generate an output voltage D which increases or decreases in proportion to the amount by which the print wire 12 is displaced toward or away from the paper. In FIG. 6, the frequency of the signal A is shown to be a few times the frequency of the signal D. This is for simplicity of illustration. In a practical system, the frequency of the signal A is about 10 MHz while the frequency of the print wire operation is serval kHz. Thus the capacitance detection circuit 3 converts the displacement of the print wire 12 into a voltage signal D and sends it to the timing pulse circuit 4.

Figure 7:
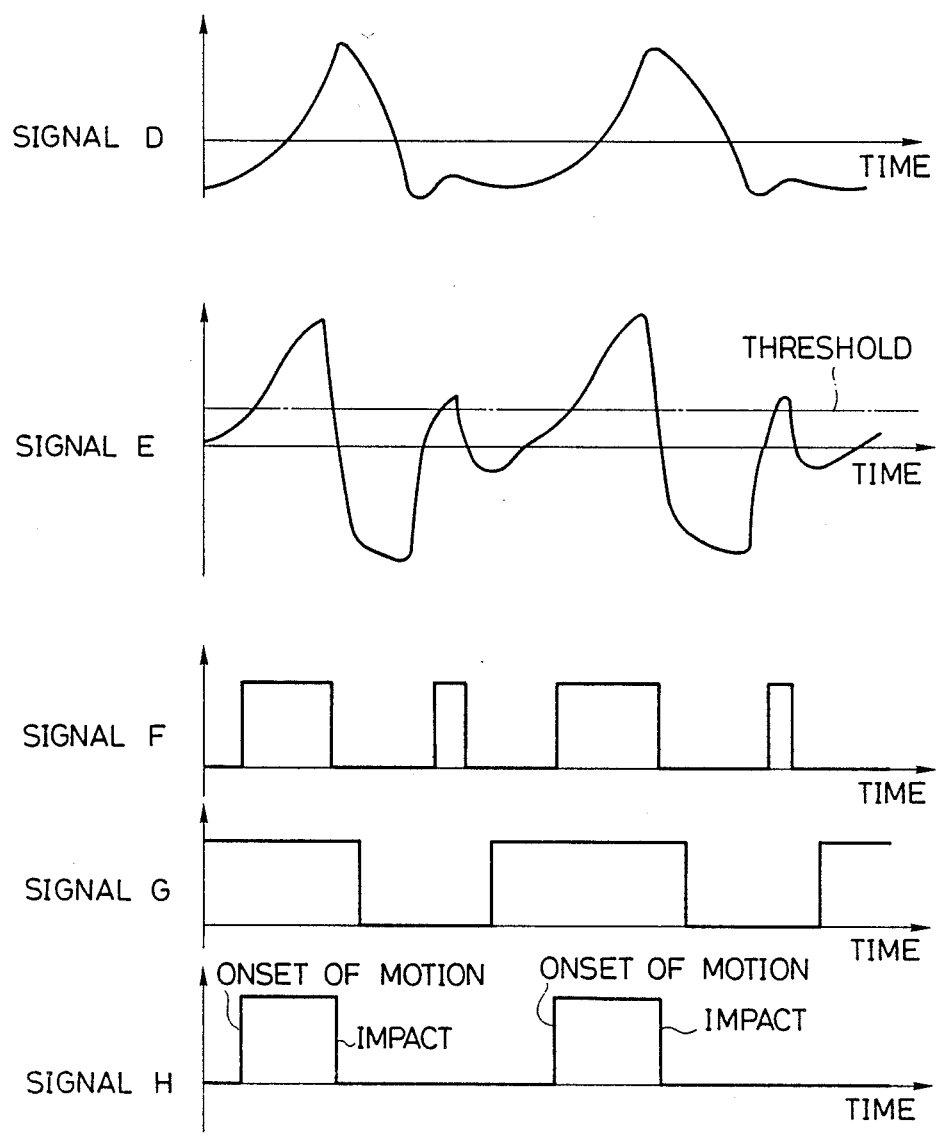

The output D of the low-pass filter 35 is connected to the input of the differentiating circuit 38, and the output of the differentiating circuit 38 is connected to the input of the voltage comparator 39. FIG. 7 shows the signal D generated as the print wire 12 moves. The signal D in FIG. 7 differs from the signal D in FIG. 6 because the time axis has been somewhat compressed in order to show the printing of two successive dots. Differentiation of the signal D yields the signal E which indicates the velocity of motion of the armature 27, and in which there is substantially no DC component. When the print wire 12 begins to move, the velocity of the armature 27 rises quickly from zero to a positive value. When the print wire 12 impacts the paper, the velocity of the armature 27 changes abruptly from a positive to a negative value. By comparing the signal E with a threshold voltage somewhat higher than zero, it is therefore possible to detect the onset of motion of the armature 27 and the moment just after impact. This comparison is performed by the voltage comparator 39 in FIG. 5, the output of which is the signal F in FIG. 7. The rising edge of a pulse in the signal F represents the onset of motion of the print wire 12; the falling edge represents the moment just after impact.

The signal F also contains shorter pulses generated when the armature 27 rebounds slightly from the core 21 on its return. The function of the AND gate 40 is to mask these rebound pulses by means of a masking signal G generated by the control circuit 6 in FIG. 1. The signal G goes High simultaneously with a drive signal sent from the control circuit 6 to the drive circuit 5 to cause printing of the dot. When the control circuit 6 detects the first falling edge of the signal H output from the AND gate 40, it makes the signal G Low, thus masking further pulses until the signal G goes High again for the printing of the next dot. Thus the signal H contains only one pulse per dot. (As will be explained later, after the drive circuit 5 generates the print signal, the action of the print head is controlled only by the rise and fall of the first pulse in the signal H, so it is not strictly necessary to mask the unwanted pulses; the unmodified signal F can be sent to the drive circuit 5).

Figure 8:
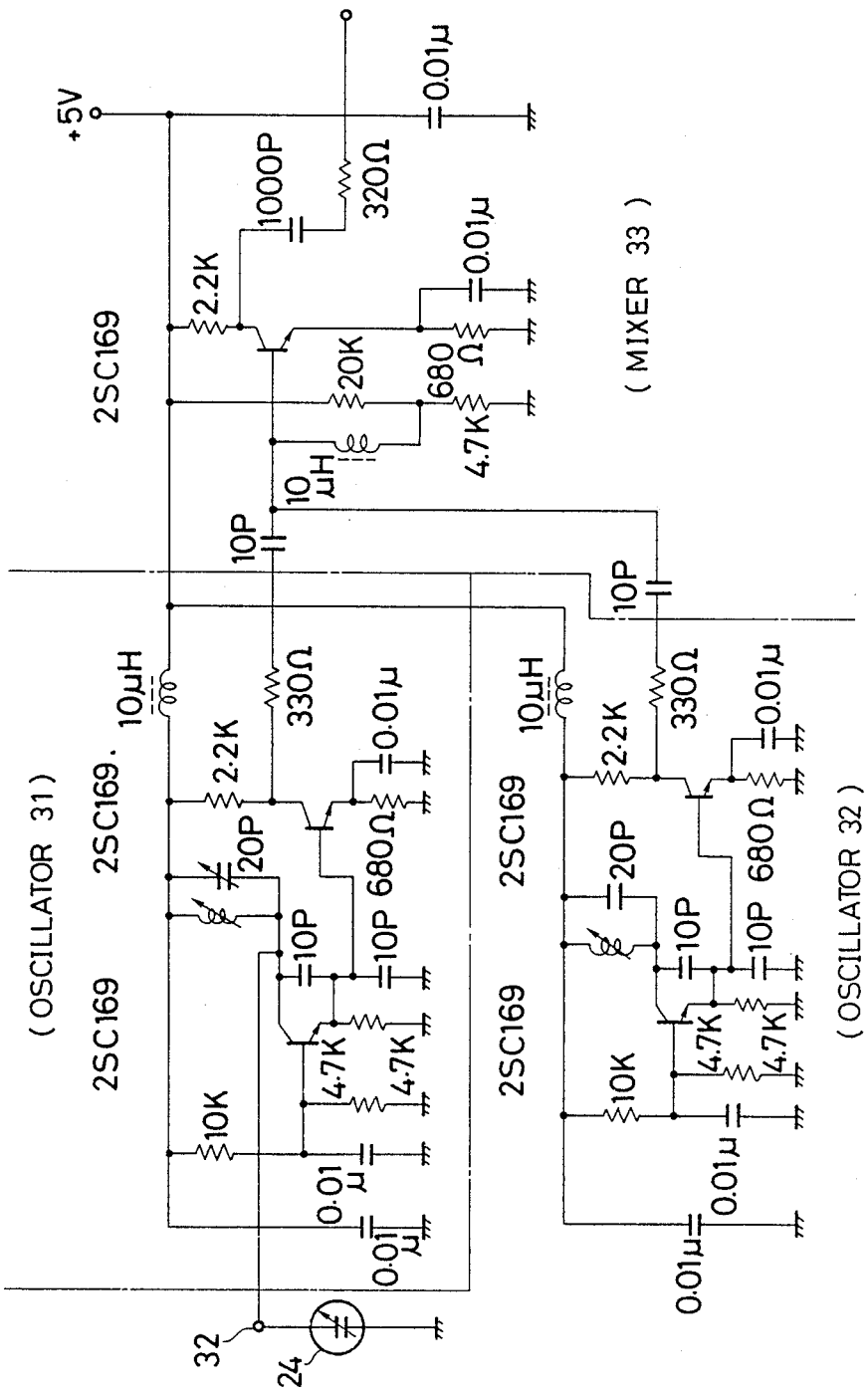
FIGS. 8 and 9 are schematic diagrams of embodiments of some of the circuit blocks shown in FIG. 5.
Figure 9:
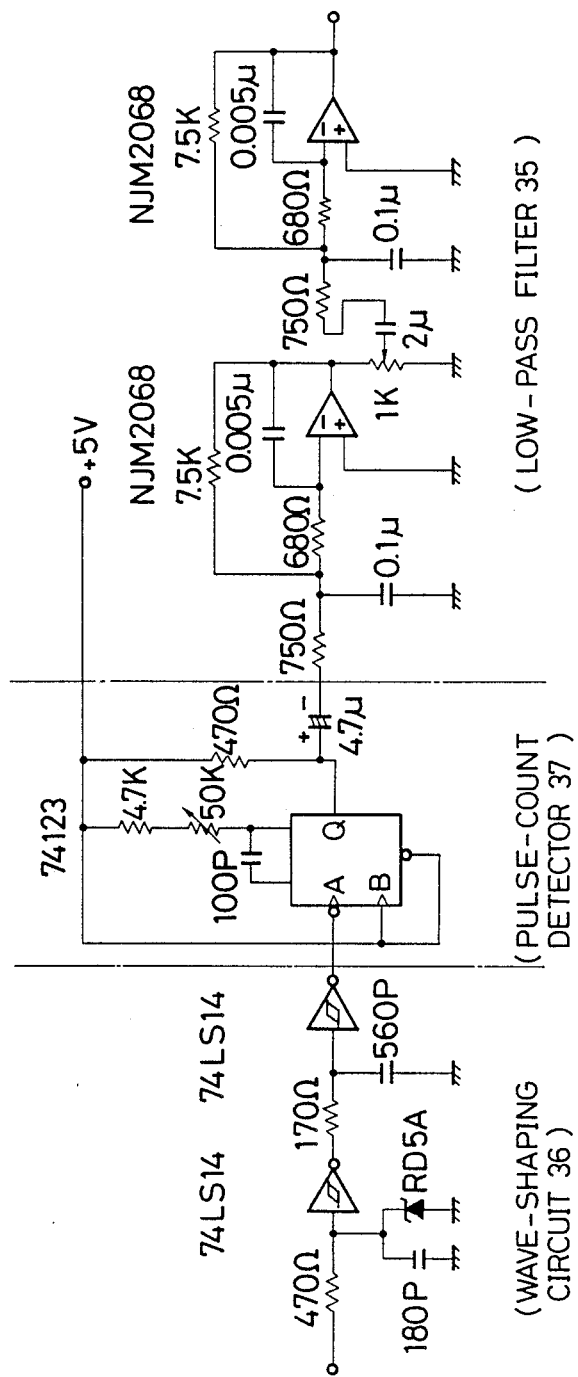

FIG. 8 shows an embodiment of the oscillator 31, the oscillator 32, and the mixer 33 in FIG. 5. FIG. 9 shows an embodiment of the wave-shaping circuit 36, the pulse generator 37, and the low-pass filter 35.

Figure 10:
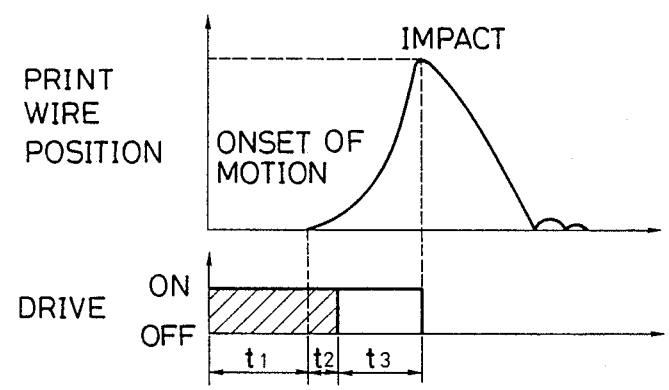
FIG. 10 illustrates the timing of the motion of a print wire during the printing of a dot.

Next the manner in which the signal H indicating the onset of motion and moment of impact of the print wire 12 is used to control the driving of the wire-dot print head 1 will be explained with reference to FIG. 10.

Figure 11:
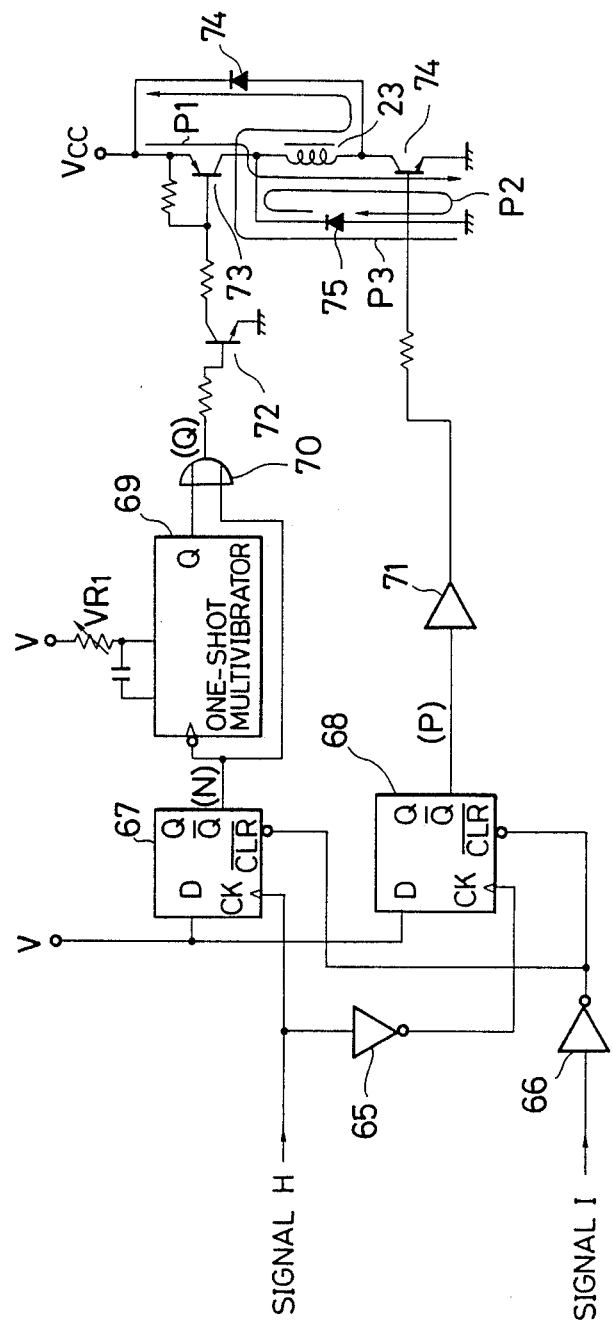
FIG. 11 is a schematic diagram of an embodiment of the drive circuit in FIG. 1.

A print signal from the control circuit 6 which exercises overall control over the wire-dot print head 1 causes the drive circuit 5 to begin energizing the coil 23 in the wire-dot print head 1. Specifically, the transistors 73 and 74 are turned on and a current begins to flow through the path P1 (FIG. 11), as will be described later in further detail. There is a delay indicated by the time t1 before the print wire 12 begins to move, because the inductance of the coil 23 delays the start of current flow, thus delaying the alteraion of the magnetic flux in the core 21. The application of voltage to the ends of the coil 23 can be stopped as soon as the print wire 12 begins to move, or after a fixed time (time t2 in FIG. 10) which is generated by a timer circuit to be described later, as measured from the rising edge of the pulse H output from the timing pulse circuit 4. Specifically, the transistor 73 is turned off while the transistor 74 is ketp on. As a result, even after the application of voltage ceases, the inductance of the coil 23 causes a current to continue flowing through the path P2 (FIG. 11), as will be described later in further detail. The optium stopping time for this current is the moment of impact of the print wire 12 on the paper, as indicated by the falling edge of the pulse H output by the timing pulse circuit 4. The drive circuit 5 thus cuts off the current at the falling edge of this pulse. Specifically, the transistor 74 is turned off and the current is made to flow back to the power supply Vcc through the path P3 (FIG. 11). This current quick diminishes.

FIG. 11 is a detailed drawing of the drive circuit 5 for one print wire. The circuit comprises a pair of inverters 65 and 66, a pair of D flip-flops 67 and 68, a one-shot multivibrator 69 which acts as a timer circuit, an OR gate 70, a buffer gate 71, transistors 72, 73, and 74, and a pair of diodes 75 and 76. There is one such circuit for each print wire, but since all the circuits are identical in structure and function, only one is shown.

Figure 12:
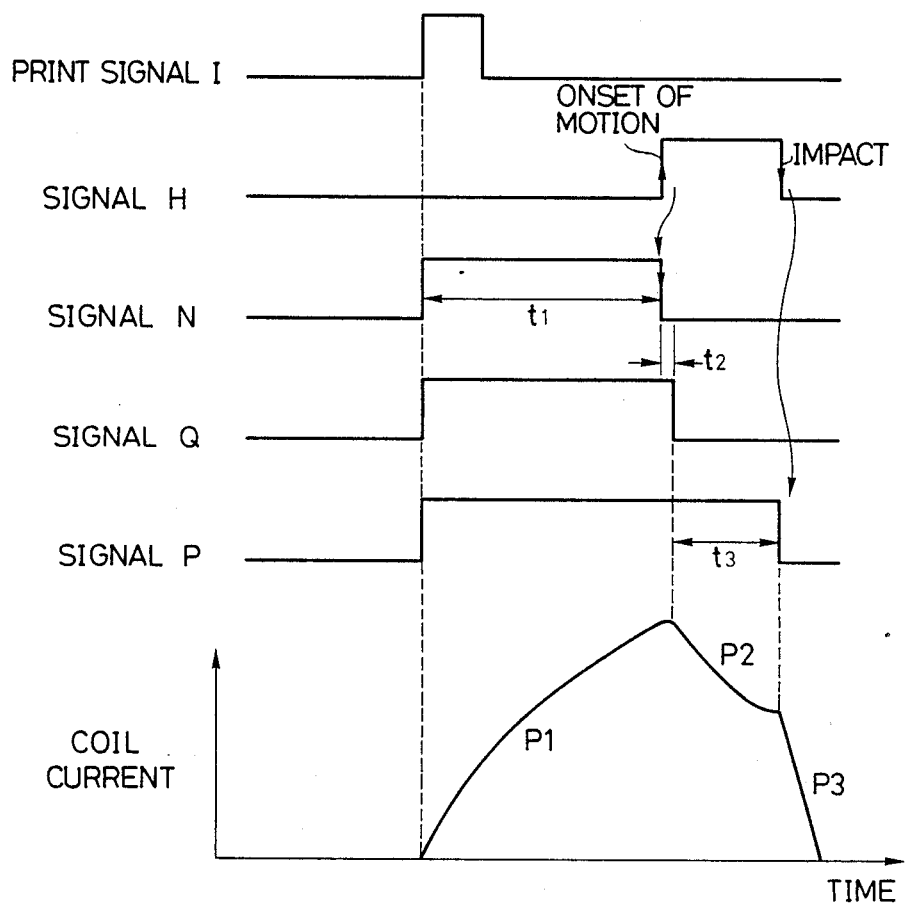
FIG. 12 illustrates the timing of the drive operation by showing waveforms at several points in the circuit in FIG. 11.

FIG. 12 shows waveforms at various points in the circuit in FIG. 11. The operation of this circuit will be explained next.

The print signal I from the control circuit 6 is inverted by the inverter 66 and applied to the clear inputs of the D flip-flops 67 and 68. The outputs N and P of the D flip-flops 67 and 68 both go High. The output N is routed through the OR gate 70 and becomes the output signal Q, which causes the transistor 72 to turn on the transistor 73. The output P is fed through the buffer gate 71 and turns on the transistor 74. As a result, the supply voltage Vcc is applied to the coil 23, causing a current flow from the Vcc supply to the transistor 73 to the coil 23 to the transistor 74 to ground as indicated by the arrow P1.

At time t1 after the print signal I, the print wire 12 begins to move and the output signal H from the timing pulse circuit 4 goes High, inverting the D flip-flop 67 and causing its output N to go Low. The falling edge of the signal N causes the one-shot multivibrator 69 to generate a single pulse of duration t2, so the output Q of the OR gate 70 remains High for the time t1+t2, and the transistor 73 remains on for this time. The time t2 can be adjusted by a variable resistor VR1 attached externally to the one-shot multivibrator 69. The preferred value depends on the type of wire dot head employed, but is normally in the range from 0 to several tens of $\mu$s.

When the signal Q goes Low, the transistor 73 turns off, cutting off the supply voltage Vcc, but the electromotive force generated by the coil 23 causes a current flow from the coil 23 to the transistor 74 to ground to the diode 75 to the coil 23 as indicated by the arrow P2. This current continues to flow for the time t3 in FIG. 10.

When the print wire 12 impacts the paper, the output H from the timing pulse circuit 4 goes Low and the falling edge of the signal H, applied through the inverter 65 to the D flip-flop 68, inverts the output signal P of the D flip-flop 68, causing it to go Low and turning off the transistor 74. The coil current is now fed back to the power supply Vcc via the path indicated by the arrow P3 in FIG. 11, and quickly falls to zero. This completes the printing of one dot.

The drive timing control operation described above is performed independently for each print wire 12 and for each printed dot. Thus magnetic interference in the wire-dot print head 1, local variations in the head gap, and other factors are correctly compensated for and do not cause faint or skipped dots or other printing defects as in the prior art. Furthermore, since the current in the coil is cut off just after the moment of impact, the print wire 12 is already rebounding from the paper when it begins to be attracted by the permanent-magnet flux in the core 21 of the electromagnet 24, so it retracts to its former position more quickly than in the prior art.

In the prior art a certain margin was added to the driving time, while in a drive apparatus according to this invention the driving time is optimized for each dot. For this reason also the average driving time is shorter than in the prior art. Benefits derived from the reduced driving time include faster printing , reduced power consumption, and a lower operating temperature of the print head.

Figure 13:
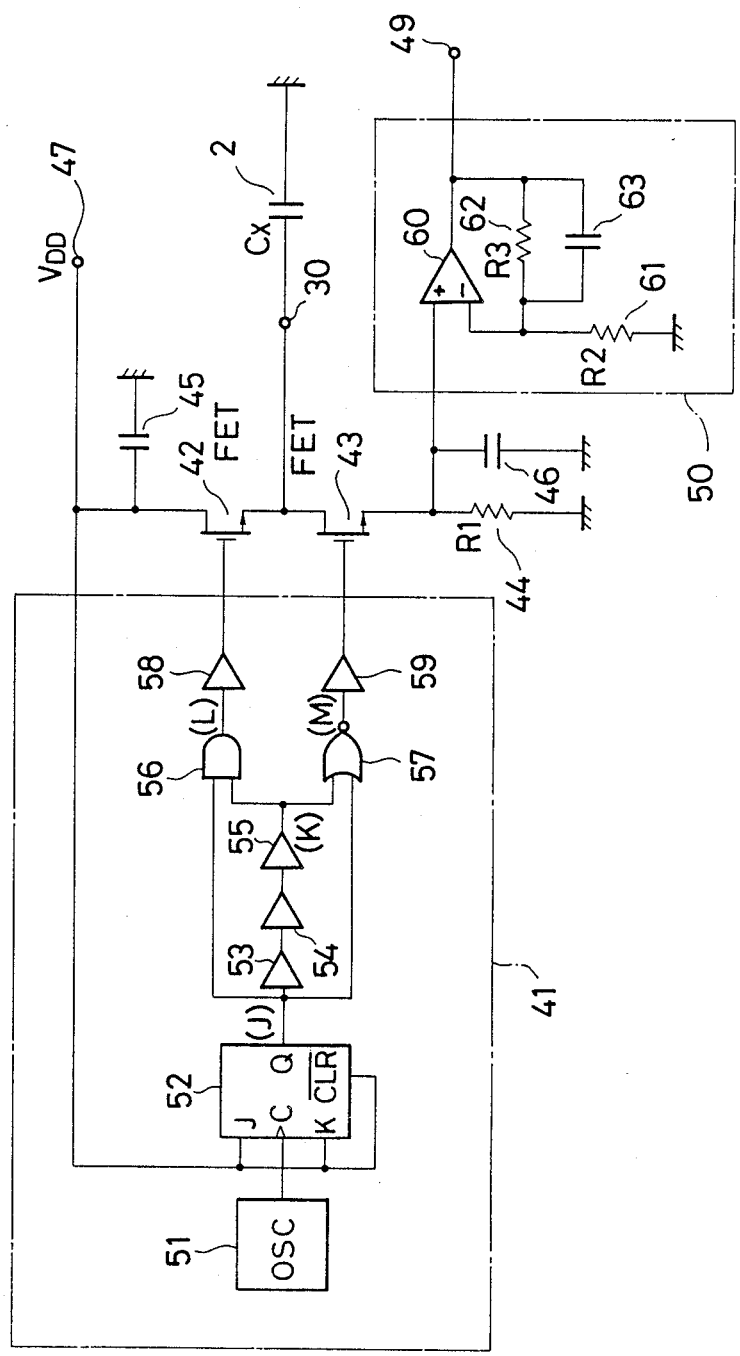
FIG. 13 is a schematic diagram of an alternative embodiment of the sensor circuit in FIG. 1.

FIG. 13 shows an alternative, more compact embodiment of the capacitance detection circuit 3 in FIG. 1. This embodiment comprises a clock oscillator 41, field-effect transistors (FETs) 42 and 43, the capacitive sensor 2, its output terminal 30, a resistor 44, capacitors 45 and 46, a power supply terminal 47, an output terminal 49, and a measurement circuit 50. The output terminal 30 of the capacitive sensor 2 is the output terminal 30 shown in FIG. 3, and functions as the input terminal of the capacitance detection circuit 3.

The clock oscillator 41 may be commonly used for all the capacitive sensors. The illustrated clock oscillator 41 comprises an oscillator 51, a flip-flop 52, delay circuits 53, 54, and 55, and AND gate 56, a NOR gate 57, and buffer drivers 58 and 59. FIG. 14 shows signal waveforms at the points J, K, L, and M in this circuit. A clock pulse with a frequency f generated by the oscillator 51 is dived by 2 in the flip-flop 52 to creat a square-wave signal J with a 50% duty cycle. The signal J is delayed by a slight amount Td by the delay circuits 53, 54, and 55, which comprise well-known components such as buffer gates. The delayed signal K is supplied together with the signal J to the AND gate 56 and the NOR gate 57. The AND gate 56 creates a signal L that is High when the signals J and K are both High. The NOR gate 57 creates a signal M that is High when the signals J and K are both Low. The signals L and M have the frequency f/2 and are 180° out of phase with each other, forming a 2-phase clock with a gap of Td between the High portions, so that the two signals L and M are never High simultaneously. These two clock signals are sent through the buffer drivers 58 and 59 to the gate electrodes of the FETs 42 and 43, respectively.

The drain of the FET 42 is connected to the power supply terminal 47 which receives a certain DC voltage $V_{DD}$ (such as 5 V) from a power supply not shown in the drawing. The source of FET 42 is connected via the terminal 30 of the sensor electrode 28 in the capacitive sensor 2. The opposite electrode of the capacitive sensor 2 is the armature 27, which is grounded as described previously. The FET 42 acts as a first switching circuit that turns on and charges the capacitive sensor 2 when the signal C is High.

The drain of the FET 43 is also connected to the output terminal 30, while its source is grounded through the resistor 44. The FET 43 thus acts as a second switching circuit that turns on and discharges the capacitive sensor 2 when the signal D is High.

The measurement circuit 50 comprises an operational amplifier 60, resistors 61 and 62, and a capacitor 63 connected in a well-known non-inverting amplifier circuit. As will be explained later, an output voltage proportional to the average current flowing through the resistor 44 is obtained at the output terminal 49.

In this circuit configuration, the FETs 42 and 43 are turned on and off repeatedly by the signals L and M supplied by the clock oscillator 41, alternately charging and discharging the capacitive sensor 2. Let Qt be the charge stored in the capacitive sensor 2 while the FET 42 is on, and let Cx be the capacitance of the capacitive sensor 2. If the FET 42 is kept on for a sufficiently long period for charging the capacitor, which period is dependent on the on-state resistance of the FET 42 and the capacitance Cx of the capacitor 2, Qt is given by the following equation:

$$Qt = Cx \cdot V_{DD} \quad (1)$$

When the FET 42 is off and the FET 43 is on, the charge Qt is released through the resistor 44 and reduced to 0, provided that the FET 43 is kept on for a sufficiently long period for the discharge, which period is dependent on the capacitance Cx of the capacitor 2 and the resistance R1 of the resistor 44. This charge-discharge cycle is repeated f/2 times per second. The total charge Qa flowing through the resistor 44 per second is therefore given by the next equation:

$$Qa = (f \times Qt)/2 = (f \times Cx \times V_{DD})/2 \quad (2)$$

The total charge Qa in this equation is equal to the average current flowing through the resistor 44. Let R1 be the resistance of the resistor 44, and let R2 and R3 be the resistances of the resistors 61 and 62, respectively, in the measurement circuit 50. Then the voltage Vo output at the output terminal 49 can be expressed as follows:

$$Vo = \{[f \times R1 \cdot (R2+R3) \cdot V_{DD}]/(2 \times R2)\} \times Cx \quad (3)$$

In a practical system,
f = 10 MHz
Cx = about 1 pF
C25 = about 0.1 uF
C26 = about 1000 pF
R1 = about 500 Ω
R2 = about 5 kΩ
R3 = about 20 kΩ
(R2+R3)/R2 = about 5
$V_{DD}$ = 5 V
Vo = several mV In this embodiment, it is clear from equation (3) that a voltage Vo precisely proportional to the capacitance Cx of the capacitive sensor 2 is obtained at the output terminal 49. This voltage signal becomes the signal D supplied to the timing pulse circuit 4. Since one terminal of the capacitive sensor 2 is grounded while the other is either connected to the power supply or grounded through the resistor 44, the impedance of the terminal 30 is always low, so external noise and other interference cannot easily enter.

The purpose of the capacitor 45 in this embodiment is to lower the impedance of the power supply and thereby accelerate the charging of the capacitive sensor 2. The purpose of the capacitor 46 is to smooth the current flowing through the resistor 44. The capacitor 63, together with the operational amplifier 60 and the resistors 61 and 62, form a low-pass filter.

The scope of this invention is not restricted to the embodiments shown in FIGS. 1 to 14. In particular, it is not necessary for the print head to have the spring-release structure illustrated in FIG. 2; it can have any structure that permits the onset of motion of the print wires and the moment of impact to be detected, so that the timing of the driving of the print wires can be optimally controlled to obtain benefits similar to those described above.

We claim:

1. A printer having a wire-dot print head comprising:
  print wires extending forward generally parallel with each other,
  armatures in association with the respective print wires, a rear end of each print wire being fixed to the associated armature,
  a substantially disk-shaped rear yoke,
  cores mounted at their rear ends on said rear yoke in association with the respective armatures, each cores having its forward end adjacent to rear surface of the associated armature,
  coils in association with the respective cores, each coil being wound on the associated core,
  a cylindrical wall surrounding said armatures, said cores and said coils,
  an annular permanent magnet forming part of said cylindrical wall,
  resilient support members in association with the respective armatures, each resilient support member having a firs end fixed at said cylindrical wall and a second end fixed to the associated armature,
  a front yoke having an annular part forming part of said cylindrical wall and protrusions extending from said annular part radially inward, each protrusion being positioned on a side of one of said armatures, and
  magnetic path means for allowing a magetic flux from said permanent magnet to pass through said core, said armature and said front yoke,
  wherein when each of the coils is not energized the associated armature is attracted toward the associated core to resiliently deform the associated resilient support member, and
  when each of the coils is energized and associated armature is released and moved forward by the action of the associated resilient support member, said print head further comprising a sensor card having a disk-shaped part positioned in front of the front yoke, and having a rear surface on which the fixed, individual electrodes are formed to face the armatures and on which a common electrode conductor is contact with the front yoke is formed, and wherein each of said individual electrodes and the confronting armature form a capacitive sensor the capacitance of which varies with the motion of the associated print wire, and the armatures are connected to the common electrode conductor.

2. A printer according to claim 1, wherein said common electrode conductor on said sensor card extends along the periphery of said disk-shaped part of said sensor card and is in contact with said annular part of said front yoke.

3. A printer according to claim 1, wherein said sensor card further comprising a band-shaped part having a first edge connected to said disk-shaped part, and a card edge connector provided at a second edge of said band-shaped part opposite to said first edge of said band-shaped part.

4. A printer according to claim 1, wherein said fixed electrodes and said common electrode conductor are formed by printing on said sensor card, and said fixed electrodes are coated with an insulating film.

5. A printer according to claim 1, further comprising:
a capacitance detection circuit for detecting the capacitance of the capacitive sensor, and
a drive circuit for causing and electric current to flow through the coils for generating a magnetic flux through the core in a direction to cancel the magnetic flux throught the core from the permanent magnet,
a control circuit for generating a print signal;
a timing circuit for generating an onset detection signal indicating the onset of motion of said print wires and an impact detection signal indicating the moment of their impact with said printing medium.

6. A printer according to claim 5, wherein said drive circuit includes:
a first current path means for connecting the electromagnet across a pair of power supply terminals to permit flow of current from the power supply to the electromagnet;
a second current path means connected across the electromagnet for permitting electric current due to any electromotive force induced in the electromagnet to flow therethrough;
a third current path means for connecting the electromagnet to said power supply to permit electric current due to any electromotive force induced in the electromagnet to flow to the power supply;
current path control means for causing an electric current to flow through said first current path means to energize said electromagnetic upon reception of said print signal, being responsive to said timing circuit for terminating the current flow through said first current path means and initiating the current flow through said second current path means upon reception of said onset detection signal, and for terminating the current flow through said second current path means and initiating the current flow through said third current path means upon reception of said impact detection signal.

7. A printer according to claim 6, wherein said current path control means terminates the current flow through said first current path means and initiates the current flow through said second current path means a fixed time after said onset detection signal is produced.

8. A printer according to claim 5, wherein said common electrode connector is grounded and said capacitance detection circuit comprises:
a resistor, one terminal of which is connected to ground;
a clock oscillator for generating a pair of clock signals having identical frequencies and a phase relationship such that said clock signals are never in the active state simultaneously;
a first switching circuit for connecting said fixed electrode to a DC power supply with a fixed voltage when one of said clock signals is active;
a second switching circuit for connecting said fixed electrode to the other terminal of said resistor when the other of said clock signals is active; and
a measurement circuit for measuring the average current flow through said resistor, whereby the output of the measurement circuit represents the capacitance of the capacitive sensor.

9. A printer according to claim 8, wherein the period of the clock signals is sufficiently long compared with the time required for the charging and discharging of the capacitor formed by the fixed electrode and the common electrode conductor.

10. An apparatus according to claim 5, wherein said capacitance detection circuit comprises:
a first oscillator, the frequency of which is controlled by the capacitance of the capacitive sensor;
a second oscillator having a fixed frequency;
a mixer for receiving the outputs of said first and second oscillators and generating their mixed output;
a first low-pass filter for selecting from said fixed output a component representing the difference in frequency of said first and second oscillators;
a wave-shaping circuit for receiving the output of said first low-pass filter and converting it to a rectangular wave;
a pulse generator producing a pulse of a fixed duration each time it receives a rectangular wave signal from said wave-shaping circuit; and
a second low-pass filter for integrating said series of pulses,
whereby the output of said second low-pass filter represents the position of the print wire.

11. A printer according to claim 1, further comprising a circuit for mesuring a capacitance of each of said capacitive elements, said circuit comprising:
means for connecting a first electrode of the capacitive element to the ground;
a resistor, one terminal of which is connected to the ground;
a clock oscillator for generating a pair of clock signals having identical frequencies and a phase relationship such that said clock signals are never in the active state simultaneously;
a first switching circuit for connecting a second electrode of said capacitive element to a DC power supply with fixed voltage when one of said clock signals is active;
a second switching circuit for connecting said second electrode of said capacitive elmene to the other electrode of said resistor when the other of said clock signals is active; and
an averaging circuit for measuring the average current flow through said resistor, whereby the output of the measurement circuit represents the capacitance of said capacitive element.

12. A printer according to claim 11, wherein the period of the clock signals is sufficiently long compared with the time required for the charging and discharging of the capacitive element.

13. A printer according to claim 11, wherein said averaging circuit comprises an operatinal amplifier.

* * * * *